United States Patent Office 3,346,461
Patented Oct. 10, 1967

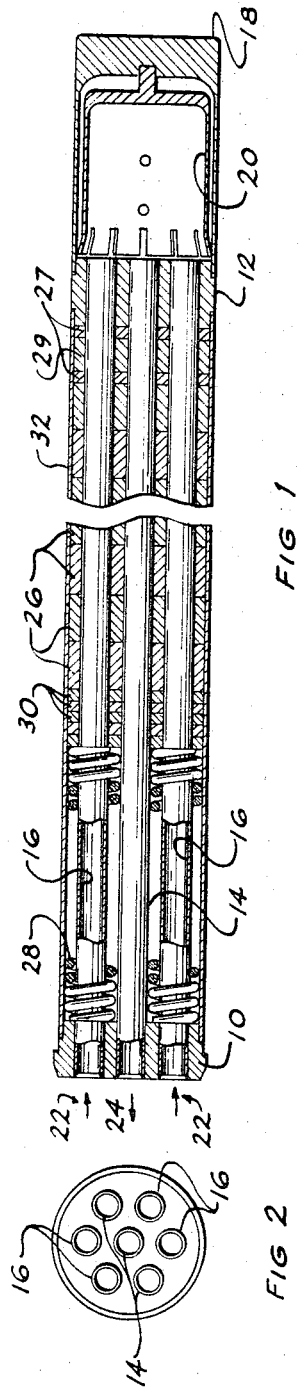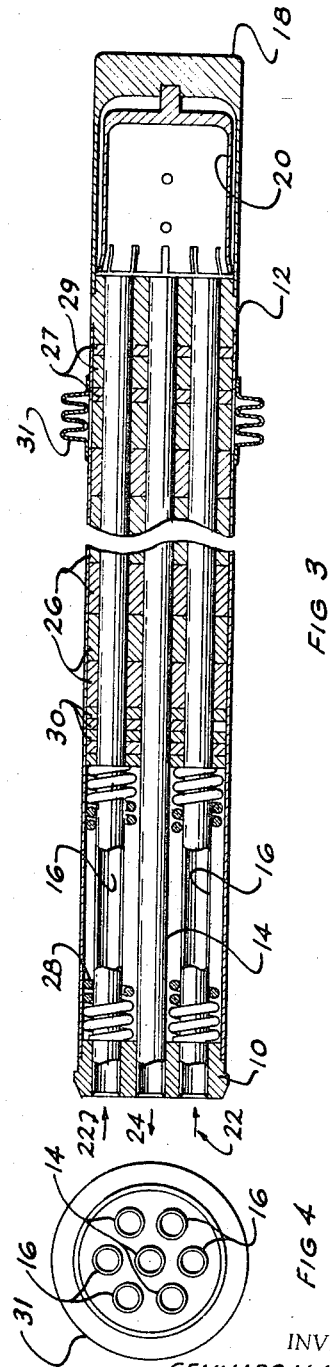

3,346,461
NUCLEAR REACTOR FUEL ELEMENT
Gennaro V. Notari, Simsbury, and Francis T. Grubelich, Wethersfield, Conn., assignors, by mesne assignments, to the United States of America as represented by the United States Atomic Energy Commission
Filed Mar. 7, 1966, Ser. No. 532,418
6 Claims. (Cl. 176—67)

This invention relates to fuel elements for a nuclear reactor and particularly to a multi-pass fuel element wherein the fluid to be heated continuously increases in temperature as it traverses the fuel element. Among the environments in which the fuel element of this invention finds utility is in superheating reactors as the superheating portion of the reactor where steam is superheated as it passes through the element.

The element includes a plurality of tubes that extend between and are interconnected with common tube sheets at their ends and the element is so characterized that the fluid to be heated, such as steam, first passes through some of the tubes and is thereafter directed through others of the tubes. For this purpose there is provided at one end of the element a deflector for receiving the steam from the first pass tubes and directing it through the second pass tubes.

The element is prestressed in order to reduce the stresses developed during operating conditions and the prestressing is such that when the first and second pass tubes are at the same temperature, such as room temperature (70° F.) as exists during manufacture of the element, the second pass tubes have a substantially higher tensile stress than the first pass tubes which may be subject to a small tensile stress or may be under compression stress. In a preferred embodiment a tubular member is disposed about and encompasses all of the tubes and extends between and is connected with the tube sheets. Fissionable or fertile material is retained within this tubular member and is positioned about the tubes with there being spring means to retain the fuel in its proper position.

In the operation of a fuel element the fluid to be heated, such as steam, increases in temperature as it passes through the tubes. The tubes accordingly increase in temperature and the second pass tubes operate at a substantially higher average temperature than the first pass tubes. Therefore, the thermal expansion of the first and the second pass tubes is substantially different and since they are connected to a common tube sheet at their ends, the stresses that would result from this differential expansion would be quite substantial and would severely limit the permissible number of operating cycles and provide a relatively low fatigue life. With the prestressing arrangement of the invention the operating stress levels produced in the element are reduced and the fatigue life of the element extended.

In the drawings:
FIG. 1 comprises a longitudinal sectional view of a fuel element embodying the present invention;
FIG. 2 is an end view of this element;
FIG. 3 is an illustration similar to FIG. 1 but showing a modified embodiment; and
FIG. 4 is an end view of the element of FIG. 3.

Referring to the drawings, the fuel element comprises a pair of tube sheets 10 and 12 between which extend the tubes 14 and 16. The tubes 16 are first pass tubes and the tubes 14 are second pass tube and in the illustrative arrangement there are four first pass tubes and three second pass tubes. Connected with tube sheet 12 is the head member 18 which includes the steam deflector 20.

The fluid to be heated by the element, such as steam that is to be superheated, passes first through the tubes 16 in the direction indicated by arrow 22 with this steam entering the steam deflector 20 and from there being directed through the second pass tubes 14 emerging from these tubes in the direction indicated by arrow 24.

Positioned about the tubes 14 and 16 are pellets 26 which are positioned in adjacent relation as disclosed and are provided with suitable openings so as to permit the tubes to pass through these pellets. These pellets may be made of or contain a fissionable material such as $U^{233}$, $U^{235}$ or $Pu^{239}$ or they may be of or contain a fertile material such as $U^{238}$ or $Th^{232}$ for use in a particular reactor design. $UO_2$ is an example of an acceptable material for the pellets. The pellets are retained in their proper position by means of the springs 28 which are compressed between the washers 30 and the tube sheet 10. There is interposed between the pellets 26 and the tube sheet 12 an insulation assembly which preferably takes the form of a body of stainless steel wool 29 interposed between a pair of washers 27.

In the preferred design of the fuel element there is provided a tubular member 32 which encompasses the tubes 14 and 16 and the fuel that is positioned about these tubes. This tubular member 32 extends between the tube sheets 10 and 12 and is secured to these tube sheets by welding. Both the FIG. 1 and FIG. 3 embodiments are provided with this tubular member 32 and these embodiments differ only in that the FIG. 3 embodiment has a flexible section 31 which forms part of the tubular member 32 and permits relatively free limited axial movement between the interconnected tube sheets 10 and 12. The tubular member 32 of the FIG. 1 embodiment does not have this flexible region.

The fuel element of either the FIG. 1 or FIG. 3 embodiment may be employed in a reactor wherein the entire element is surrounded by water which, in operation of the reactor, is in a boiling condition to produce steam with this water being in engagement with the tubular member 32. The steam thus produced may then be directed through the first pass tubes 16 and thence through the second pass tubes 14 to superheat the same.

In order to reduce the stresses developed in the tubes 14 and 16 due to the differential thermal expansion of these tubes in operation, the fuel element of the invention is in a prestressed condition, i.e., when it is manufactured it is prestressed. This prestressing is such that when the tubes 14 and 16 and the tubular member 32 are at the same temperature, such as room temperature (70° F.), as will prevail during manufacture, the second pass tubes will be stressed in tension to a substantial value while the first pass tubes may be under much less tension or may be in compression.

The tubes 14 and 16 and the tubular member 32 are all made of a suitable alloy material which will withstand the operating conditions to which the element is subjected. For instance, these member may be made of Inconel 625.

As previously explained, the prestressing of the element is introduced during the manufacture. In the embodiment of FIG. 3 it will only be the tubes 14 and 16 that are prestressed since the flexible region 31 of the tubular member 32 is such that longitudinal stresses in this tubular member are of no consequence. The flexible portion permits the tube sheets 10 and 12 to move the distance required to accommodate thermal expansion of the tubes 14 and 16 without developing any significant stresses in the tubular member 32. This is not so, however, with the FIG. 1 embodiment. In this FIG. 1 embodiment there is no flexible region in the tubular member 32. Accordingly, in the manufacture of this embodiment of the fuel element this tubular member is also prestressed.

To illustrate how the fuel element of the invention may be fabricated and referred particularly to FIG. 1; in an Inconel 625 element approximately 60 inches in length and where the tubular member 32 is about 1½ inches in diameter, the tube sheets, the tubes 14 and 16, and the other portions of the element are assembled into their proper relation. The tubes 14 and 16 are welded to one of the tube sheets such as, for example, the tube sheet 10. The tubular member 32, which in the arrangement now being described does not have a flexible section, is welded to both of the tube sheets. The first pass tubes are somewhat shorter than the tubular member 32 as, for example, .031 inch shorter and the second pass tubes are shorter than the first pass tubes such as, for example, .040 inch shorter. The element is placed in a jig and the element is compressed .031 inch so that the first pass tubes are flush with tube sheet 12. The first pass tubes are then welded to this tube sheet. The element is then further compressed .040 inch until the second pass tubes are flush with tube sheet 12 and the second pass tubes then welded. The element is then removed from the jig with the result that a normal room temperature (70° F.) the second pass tubes are under a tension of 23,110 p.s.i. while the first pass tubes are under a tension of 3,470 p.s.i. and the tubular member 32 is under a compression of 23,090 p.s.i. With this arrangement the stresses that are developed in the tubes 14 and 16 and in the tubular member 32 when the fuel element is at its normal operating temperature in a reactor, will be substantially less than if this prestressing were not introduced into the element. In a particular arrangement wherein the tubular member 32 is surrounded by water at 540° and where the first pass tubes 16 have a steam entering temperature of 540° and the second pass tubes 14 have a steam leaving temperature of 950°, the longitudinal stresses with this prestressing will be:

|   | P.s.i. |
|---|---|
| Second pass tube compression stress | 17,470 |
| First pass tube compression stress | 6,460 |
| Tubular member 32 tension stress | 11,212 |

If prestressing were not utilized, the stresses developed would be:

|   | P.s.i. |
|---|---|
| Second pass tube compression | 40,580 |
| First pass tube compression stress | 9,930 |
| Boiler tube tensile stress | 22,790 |

The FIG. 3 embodiment may be manufactured in a manner similar to that of the FIG. 2 embodiment. However, there will be no longitudinal stress of any significance developed in the tubular member 32 during manufactoure or in operation of the element because of the flexible region 31. Accordingly, in assembling the element the tubular member 32 and the first pass tubes are welded to the tube sheets 12 and 10. The second pass tubes which are somewhat shorter than the first pass tubes, such as .060 inch, are welded to one of the tube sheets and then the element is compressed until the other end of the second pass tubes 14 are flush with the other tube sheet and then these tubes are welded to this tube sheet. This provides a prestressing such that the second pass tubes have a tensile stress of 17,020 p.s.i. while the first pass tubes have a compression stress of 12,760 p.s.i. Under the previously described operation conditions wherein there is a water temperature of 540° and a steam entering temperature of 540° and a steam leaving temperature of 950°, the operating stresses with prestressing will be:

|   | P.s.i. |
|---|---|
| Second pass tube compression stress | 8,544 |
| First pass tube tensile stress | 6,312 |

If prestressing were not utilized, these stresses developed would be:

|   | P.s.i. |
|---|---|
| Second pass tube compression stress | 25,564 |
| First pass tube tensile stress | 19,172 |

It thus will be seen that with the prestressing arrangement of the present invention in this two-pass superheater fuel element there is a substantial reduction in the stresses developed at normal operating conditions in a reactor such that fatigue life of the element is substantially extended over what it would otherwise be.

What is claimed is:

1. In a superheater fuel assembly comprising a plurality of tubes extending between and being interconnected with a pair of tube sheets, a fissionable material positioned about said tubes the improvement comprising means forming part of said assembly whereby steam may be directed for passage first through some of said tubes and then in series through others of said tubes, said assembly being prestressed such that at room temperature the second pass tubes are under tensile stress while the first pass tubes are under a less tensile stress or a compression stress so that during operation in a reactor wherein the second pass tubes are at a higher temperature than the first pass tube the stresses in these tubes will be less than they would be without this prestressing.

2. The fuel assembly of claim 1 wherein there is provided a steam deflector at one end of said element to receive the steam from the first pass tubes and convey it to the second pass tubes.

3. The fuel assembly of claim 1 characterized by a metallic tubular member extending between and secured to said tube sheets and encompassing said tube and said fissionable material, said tubular member being substantially free of longitudinal stresses both at room temperature and at the operating temperature of the fuel element, and the tubes being prestressed such that at room temperature the second pass tubes are in tension and the first pass tubes are in compression.

4. The fuel element of claim 1 including a metallic tubular member extending between and secured to the tube sheets, said tubular member along with the tubes being prestressed with the prestressing being such that at room temperature the second pass tubes are in tension, the first pass tubes are in tension but less tension than the second pass tubes and said tubular member is in compression.

5. The fuel element of claim 4 wherein said tubes and said tubular member are of the same material.

6. The fuel element of claim 1 wherein said fissionable material is in the form of a plurality of fuel pellets having openings therein for receiving said tubes with there being spring means provided about some of the tubes for urging and maintaining the fuel pellets in position.

References Cited
UNITED STATES PATENTS

| 3,033,773 | 5/1962 | Schluderberg | 176—49 X |
| 3,140,237 | 7/1964 | Peterson et al. | 176—72 X |
| 3,156,625 | 11/1964 | Harty et al. | 176—72 X |
| 3,178,354 | 4/1965 | Vann et al. | 176—72 X |
| 3,208,917 | 9/1965 | Bosshard | 176—61 X |
| 3,212,985 | 10/1965 | Hackney | 176—61 X |
| 3,245,881 | 4/1966 | Ammon et al. | 176—61 X |

CARL D. QUARFORTH, *Primary Examiner.*

M. J. SCOLNICK, *Assistant Examiner.*